March 7, 1967 K. R. HACKETT 3,308,387

CLOCK SYNCHRONIZER

Filed Sept. 18, 1963 4 Sheets-Sheet 1

INVENTOR.
KENNETH R. HACKETT
BY R. P. Campbell
ATTORNEY

INVENTOR.
KENNETH R. HACKETT
BY R. P. Campbell
ATTORNEY

INVENTOR.
KENNETH R. HACKETT
BY R. P. Campbell
ATTORNEY

INVENTOR.
KENNETH R. HACKETT
BY [signature]
ATTORNEY

United States Patent Office 3,308,387
Patented Mar. 7, 1967

3,308,387

CLOCK SYNCHRONIZER

Kenneth R. Hackett, Boulder, Colo., assignor to Ball Brothers Research Corporation, Boulder, Colo., a corporation of Colorado Filed Sept. 18, 1963, Ser. No. 309,794
7 Claims. (Cl. 328—155)

This invention relates to signal processing circuits, and more particularly to such circuits for generating a clock signal in synchronism with an incoming signal.

In the transmission of information by electrical signals, distortion of the signal commonly occurs, especially with respect to the timing and phase relationship of the information on the signal. The resulting signal which arrives at the receiver is an approximation of the original signal with much jitter superimposed thereon. Jitter is due to low frequency components in the data, or noise in the transmission path. This jitter may cause the information signals to be processed at the receiving terminal in a manner quite different from that intended, thereby resulting in the transmitted and received information not being accurate or faithful reproductions of each other. When such information comprises a digital television picture, for example, the composite picture resulting at the receiver can be obliterated by inaccuracies as to be unintelligible to a viewer.

It has been determined that an ideal system would need to provide means at the receiver for synchronizing a clock generator with the incoming signal in order to retime and reshape the signal. The phase of such a locally generated clock signal in the receiver would have to be maintained at a constant relationship with the incoming signal over a long period of time and in spite of frequency variations of this incoming signal within certain limits. In addition, if the incoming signal were to be interrupted for a period of time, the system should provide a means to pull the clock signal into phase with the incoming signal when it returns and lock the two signals in synchronism. However, the pull-in range should be greater than the frequency variances of the incoming signal, but the transient response should be slow enough so that the clock generator does not track the lowest frequency component of jitter in the incoming signal.

In the past, for some applications requiring the synchronization of a local oscillator to an incoming signal, it has been possible to employ a simple phase lock loop system such as that illustrated by FIGURE 1, which shows a conventional phase lock loop in block diagram form. An incoming signal 15 is fed to a mixer or phase detector 12 which compares the phase of a clock signal 13 from oscillator 14 to the phase of the signal 15. A control signal from phase detector 12, approximating a D.C. voltage and having an amplitude proportional to the phase difference determined by phase detector 12, is fed into amplifier 16. Amplifier 16 emits a signal which is an amplified reproduction of the control signal from phase detector 12. This amplified signal is fed into filter 18 which filters out substantially all of the high frequency components or noise comprising jitter. The output of filter 18 is fed back into oscillator 14 to control its frequency. Thus, by controlling the frequency of oscillator 14, the clock signal 13 of the oscillator 14 can be held in phase with the input signal 15, and at a frequency $F_2$ which is equal to the average frequency $F_1$ of the input signal 15, as it varies within certain limits. This controlled frequency $F_2$ of the output of oscillator 14 is coupled out of oscillator 14 through the output 19.

As previously stated, a control signal from the phase detector 12 is generated by, and has an amplitude proportional to, the phase difference between the input signal

15 and the pulse signal 13 from the oscillator 14. Since it is desired to maintain these two signals in phase with each other, any control voltage generated will be small due to a very small phase difference. Therefore, amplifier 16 is inserted in the circuit to amplify the control voltage to a level sufficient to change the frequency of oscillator 14.

There are many applications involving the processing of information signals in which the above systems cannot be satisfactorily employed for reasons which will be described. For example, in the area of digital television where a digital approximation of an analog signal is utilized, the 60 cycles per second frequency pattern of the analog signal tends to create jitter or other undesirable high frequency components on the digital approximation signal. In addition, in a digital signal having a bit rate of several megacycles and above, the frequency or bit rate can vary over wide limits due to several causes. A safe frequency tolerance would be $\pm 1$ kilocycle from a nominal 10 megacycles.

For a clock synchronizer to synchronize a clock signal with an incoming pulse train having a variance such as the above, several requirements must be fulfilled which are unobtainable by the previously described phase lock system. First, the transient response in the system should be sufficiently slow to avoid tracking the jitter present in the incoming information signal, which can be as low as 60 cycles per second or lower. Also, the transient response in the system should be sufficiently fast to force the oscillator to pull in over a $\pm 1$ kilocycle range of frequency variation. As a result, to produce an acceptable system, a compromise of these two requirements is necessary, but virtually impossible to achieve.

In view of the physical limitation described above and the numerous difficulties and shortcomings of the methods and apparatus employed heretofore, it was completely unexpected and surprising to discover a method and apparatus which permit generating a clock signal in synchronism with an incoming information signal.

Accordingly, it is an important object of this invention to provide a method and apparatus for maintaining the phase of a clock signal in a constant relationship to an incoming signal over a long period of time and during frequency variations of the incoming information signal.

Another object of this invention is to provide a clock synchronizer which allows the incoming signal to be interrupted for a period of time, and upon its return, provides means for pulling a clock signal into phase and locking it into phase with the pulse train, and, at the same time, assure that the lowest frequency component of jitter in the incoming signal will not be tracked.

Additional objects of the invention will become apparent from the following description which is given primarily for purposes of illustration and not limitation.

Stated in general terms, the objects of the invention are attained by providing a method and apparatus for maintaining the phase of a clock signal in a constant phase relationship with the phase of an incoming signal over substantial periods of time, and during frequency variations of the incoming signal, which comprises means, such as a first voltage variable oscillator, for generating a first signal, maintaining the frequency of this first signal a fixed differential from the frequency of the incoming signal, means such as a second voltage variable oscillator, for generating a second signal, means for maintaining the phase of the second signal at a constant phase relationship with the phase of the incoming signal, and converting the first and second signals into a clock signal having a frequency equal to the sum of the frequencies of the first and second signals.

Thus, the objects of the invention are attained by employing two modes of operation simultaneously. Namely, a frequency lock mode and a phase lock mode. Very briefly stated, a frequency lock portion, comprising frequency comparator and frequency detector circuits, controls a first voltage variable oscillator so that its frequency is maintained at a precisely fixed amount below the frequency of the incoming signal. Then, a second voltage variable oscillator, having a frequency nominally equal to the differential between the frequencies of the first oscillator and the incoming signal, emits a signal which is combined with the signal from the first oscillator in a mixer circuit. The filtered mixer output has a frequency equal to the sum of the first and second oscillator frequencies, which is approximately equal to the frequency of the incoming signal. Conventional phase lock circuitry then controls the second oscillator to assure a constant phase relationship with the incoming signal.

Since frequency lock control and phase lock control are performed simultaneously, but independently, the large pull-in range is achieved by the frequency lock portion, and yet the phase lock portion only has a pull-in and tracking range of several cycles. Because this tracking range can be relatively small compared to the original requirement, the loop gain can be small. Therefore, the transient response can be very slow and still provide for stable operation.

A more detailed description of a specific embodiment of the invention, by means of which the objectives of the invention can be carried out, is given below with reference to the accompanying drawings, wherein.

Figure 6:
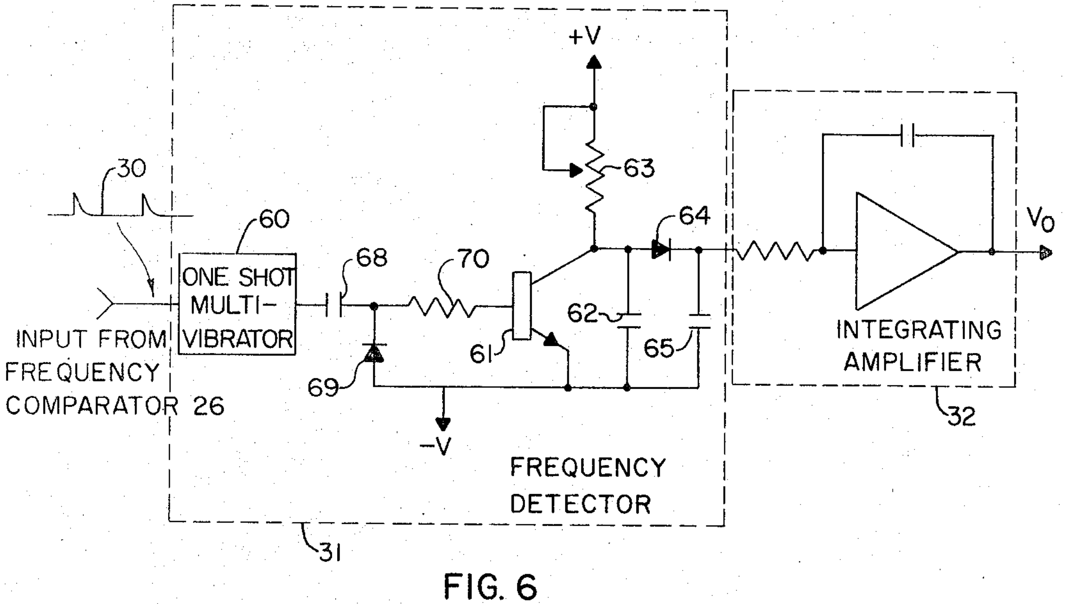

FIGURES 4(A) to 4(F) show schematic voltage-time diagrams characteristic of the invention;

FIGURES 5(A) to 5(F) show schematic voltage-time diagrams characteristic of the invention;

FIGURE 6 is a schematic circuit diagram of a frequency detector in accordance with the present invention; and FIGURES 7(A) to 7(C) show schematic voltage-time diagrams characteristic of a frequency detector of the present invention.

In the specific embodiment of the invention shown in the drawings, it is preferable that the frequency $F_3$ of the incoming signal be equal to its bit rate. If the incoming signal is in the form of a continuous wave, the frequency doubler 22 shown in FIGURE 2 can be circumvented. Since digital data is normally transmitted in a non-return to-zero form, in which the predominant frequency component is one-half of the bit rate, the frequency doubler 22 serves to double the frequency of the incoming signal to obtain a frequency $F_3$ equal to the bit rate of the incoming digital signal.

A local voltage-variable oscillator 23, which is crystal-controlled, generates a signal having a frequency $F_4$ which is approximately 100,000 cycles per second below $F_3$. These two signals having frequencies $F_3$ and $F_4$ respectively, are mixed in a mixer unit 24. The output of mixer 24 passes to low-pass filter 25 which filters out and rejects all but the difference frequency $F_5=F_3-F_4$, which is approximately 100,000 cycles per second. A frequency comparator 26 is coupled to the low-pass filter 25 and compares the difference or beat frequency $F_5$ of the signal from filter 25 with the frequency $F_R$ of a signal from reference oscillator 27, which is 50 cycles per second greater than the nominal 100,000 cycles per second passing through low-pass filter 25.

Figure 2:
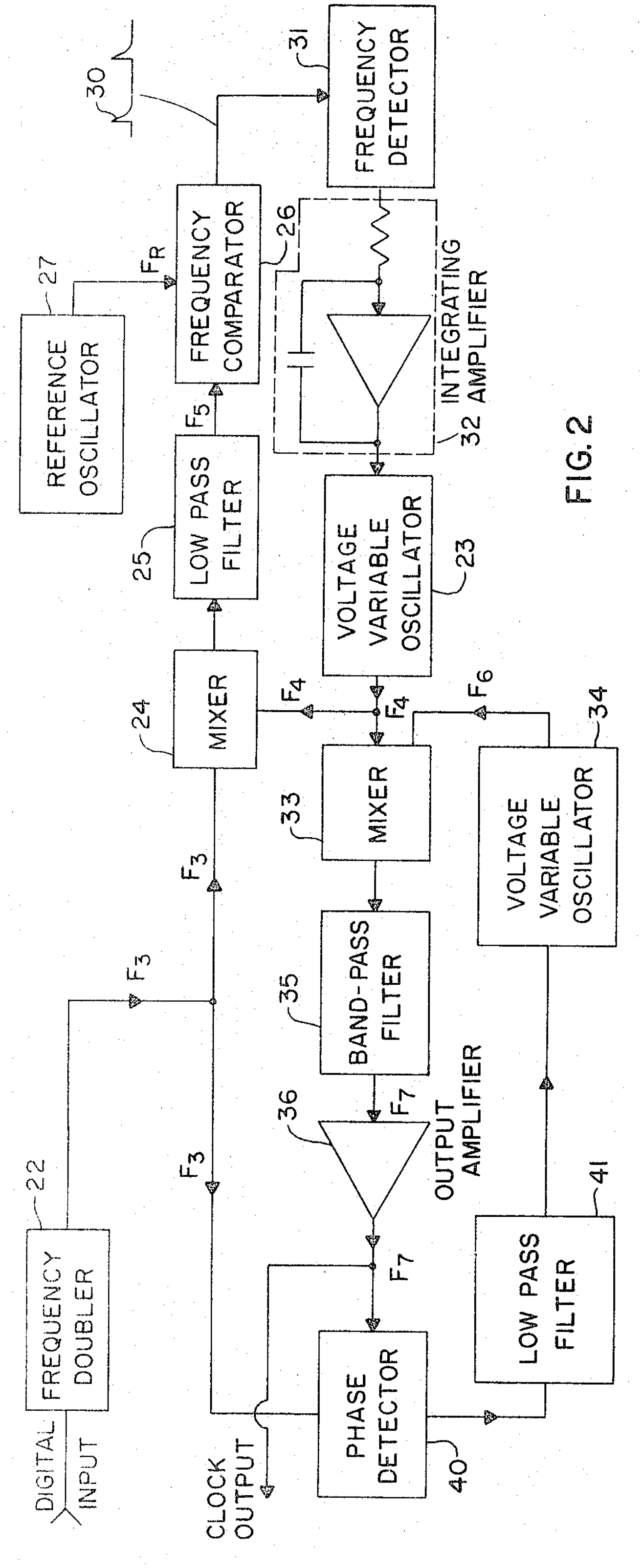
FIGURE 2 is a block diagram schematically showing a specific embodiment of a digital clock synchronizer of the present invention.
Figure 1:
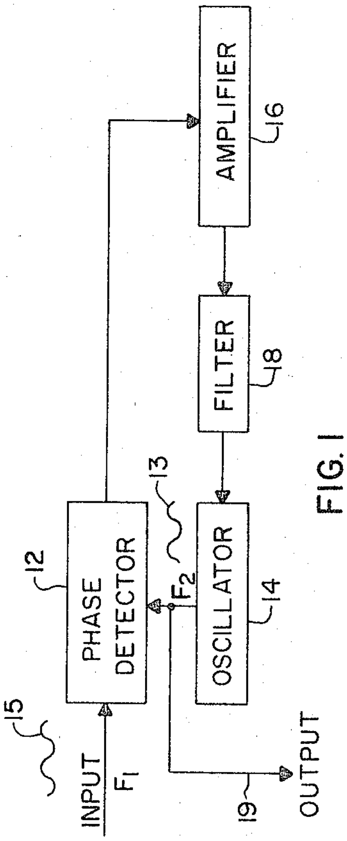
FIGURE 1 is a block diagram schematically showing a prior art type of phase lock loop.
Figure 3:
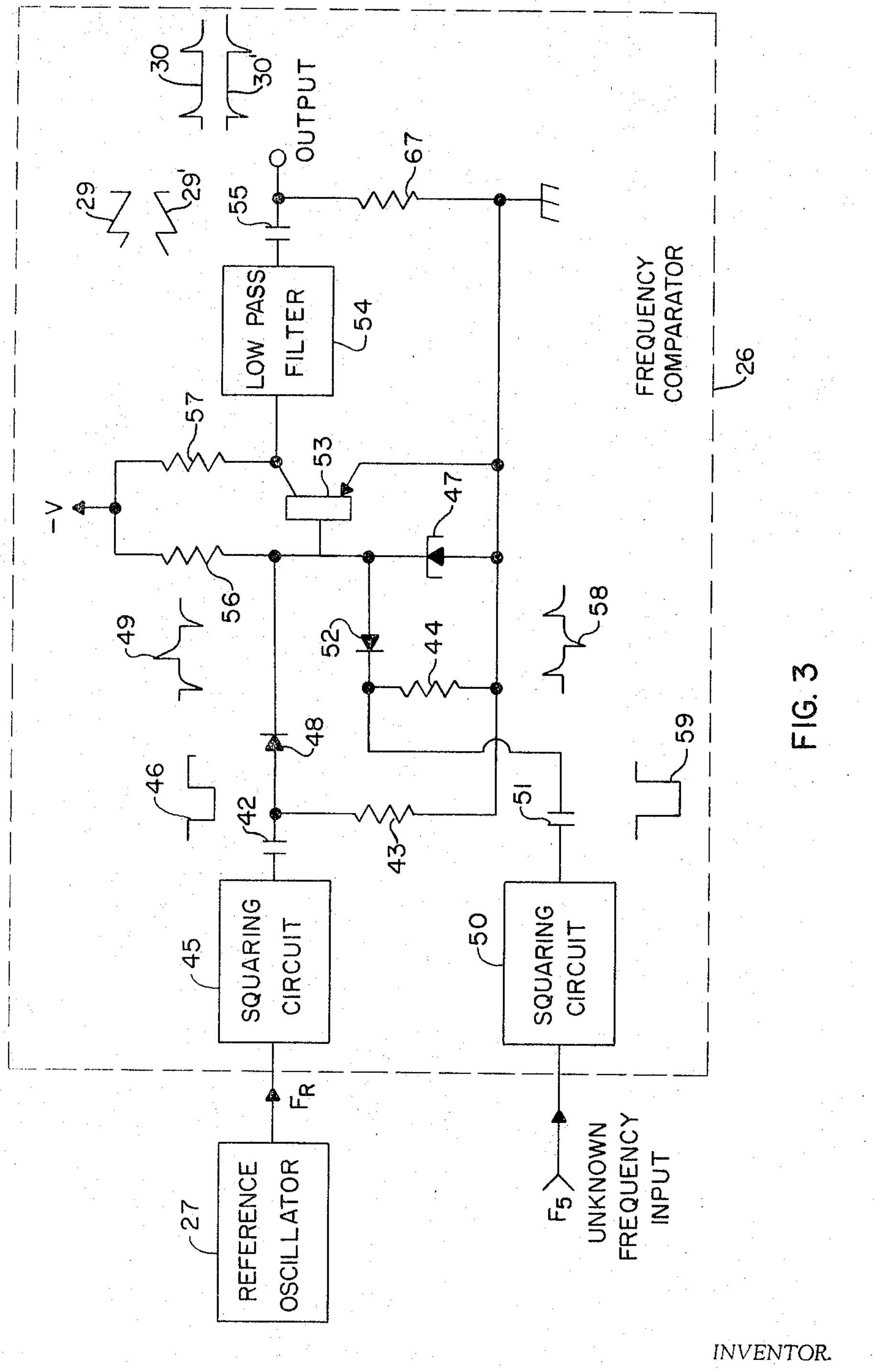
FIGURE 3 is a schematic diagram of a frequency comparator of the present invention shown partly in circuit form and partly in block form.

Frequency comparator 26 can be more fully described with reference to FIGURES 3, 4, and 5. Referring now to FIGURE 2, reference oscillator 27 generates a signal wave having a frequency of $F_R$ which is coupled to a squaring circuit 45, which converts the signal wave to a square wave 46 having the same frequency. This square wave 46 is differentiated by means of capacitor 42 and resistor 43, forming the positive spike 49, shown in FIGURE 4(B). The resulting signal is coupled to the tunnel diode 47 through diode 48, which acts to switch tunnel diode 47 to its low voltage state. Tunnel diode 47 is biased with a current equal to one-half of its peak current through resistor 56. In this condition, the tunnel diode is stabilized in either of its voltage states. For the configurations used here, the voltage across the tunnel diode 47 is negative when it is in its high voltage state.

Similarly, the unknown frequency $F_5$ is converted to a square wave 59 by squaring circuit 50, differentiated by means of capacitor 51 and resistor 44, forming the negative spike 58, shown in FIGURE 4(A). This signal is coupled to tunnel diode 47 by means of diode 52. The negative pulse switches tunnel diode 47 to its high voltage state and causes the transistor 53 to saturate. The collector voltage of transistor 53 alternately swiches beween —V and zero as tunnel diode 47 is switched in and out of its high voltage state. Collector resistor 57 returns the collector to the —V power supply. If the unknown frequency $F_5$ is lower than the reference frequency $F_R$, the negative-going portion of the tunnel diode voltage waveform shown in FIGURE 4(C), will gradually become shorter.

Figure 4:
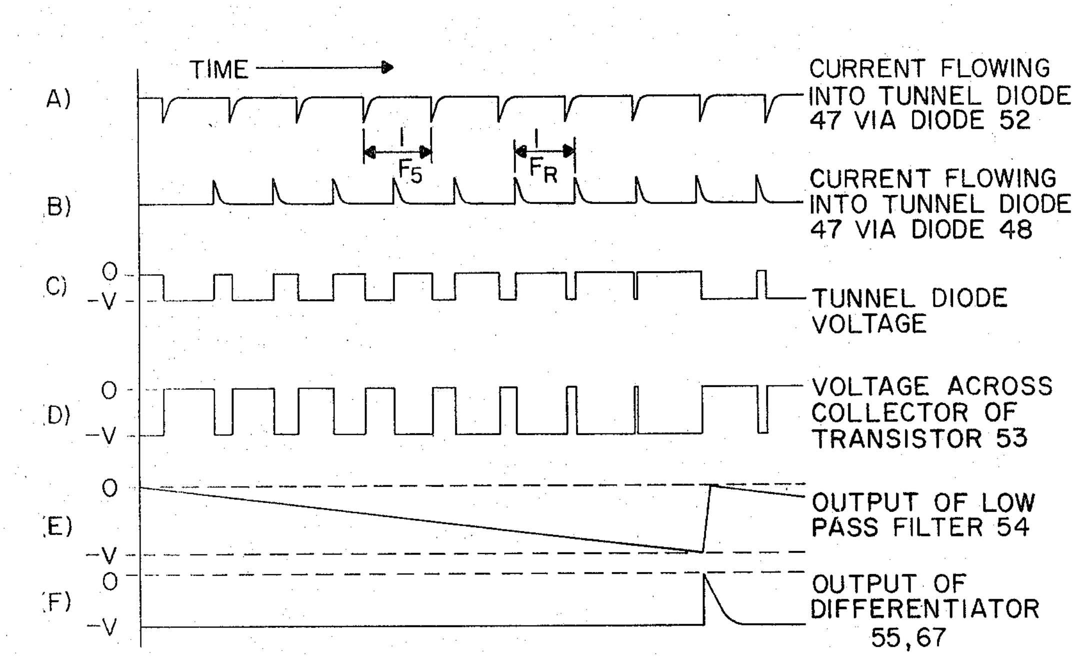
Figure 5:
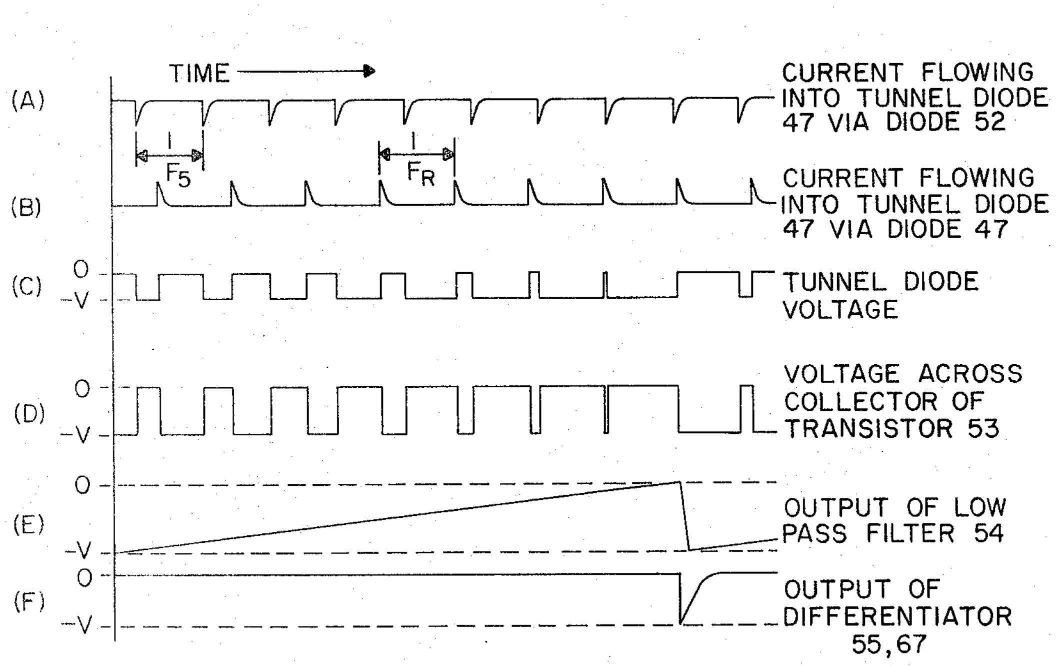

The frequency difference between $F_5$ and $F_R$ is greatly exaggerated throughout FIGURE 4 to illustrate the process more clearly.

Since transistor 53 inverts the polarity of the tunnel diode waveform, the collector waveform will appear, as shown in FIGURE 4(D), as the inverse of FIGURE 4(C). It becomes narrower until the two trigger pulses coincide. After that, the positive portion of the collector pulse suddenly becomes long, followed by a gradual decrease in length. The result is a pulse train at the collector of the transistor 53 which has a repetition frequency of approximately 100,000 cycles per second and whose width gradually decreases to zero after a sudden increase, after which the cycle repeats. The waveform at the collector of transistor 53 is filtered by low-pass filter 54, which cuts off well below the fundamental frequency of the pulse train which is 100,000 cycles per second. The characteristic of the pulses in the pulse train of gradually decreasing in width and suddenly increasing, results in the output 29 from low-pass filter 54 showing a gradually negative-going voltage followed by a suddenly positive-going voltage as shown in FIGURE 4(E). This resulting saw-tooth waveform 29 from low-pass filter 54 is differentiated by capacitor 55 and resistor 67 and results in a positive pulse train 30, since $F_5$ is less than $F_R$, as shown in FIGURE 4(F).

From an unknown frequency $F_5$ greater than reference frequency $F_R$ from reference oscillator 27, opposite results are obtained as shown in FIGURES 5(A) through 5(F). Thus, the width of the pulses at the collector of transistor 53 gradually increases followed by a sudden decreases to zero. Also, the voltage 29′ from low-pass filter 54 corresponds by also gradually going positive and then suddently going negative, as shown in FIGURE 5(E). The saw-tooth waveform 29′ from low-pass filter 54 is again differentiated and results in a negative pulse train 30′ since $F_5$ is greater than $F_6$, as shown in FIGURE 5(F). In either case, the resulting repetition rate of the signal which passes to the frequency detector 31 is equal to the differentiated frequency $F_R-F_5$.

The overall function of frequency comparator 26 is to generate a signal which defines the frequency $F_5$ of an unknown signal with respect to the frequency $F_R$ of a reference oscillator 27. The output signal 30 or 30' of the frequency comparator 26 is a pulse train having a frequency equal to the difference between the unknown frequency $F_5$ and the frequency $F_R$ of the reference oscillator 27. In addition, the polarity of the pulses of the output signal 30 or 30' indicates which of the two input frequencies, $F_5$ or $F_R$ is higher.

For normal operation, the frequency $F_5$ is 50 cycles per second less than $F_R$. The positive pulse train 30 having a frequency of 50 cycles per second is thus fed into frequency detector 31 which is designed to accept position pulses only.

Figure 7:
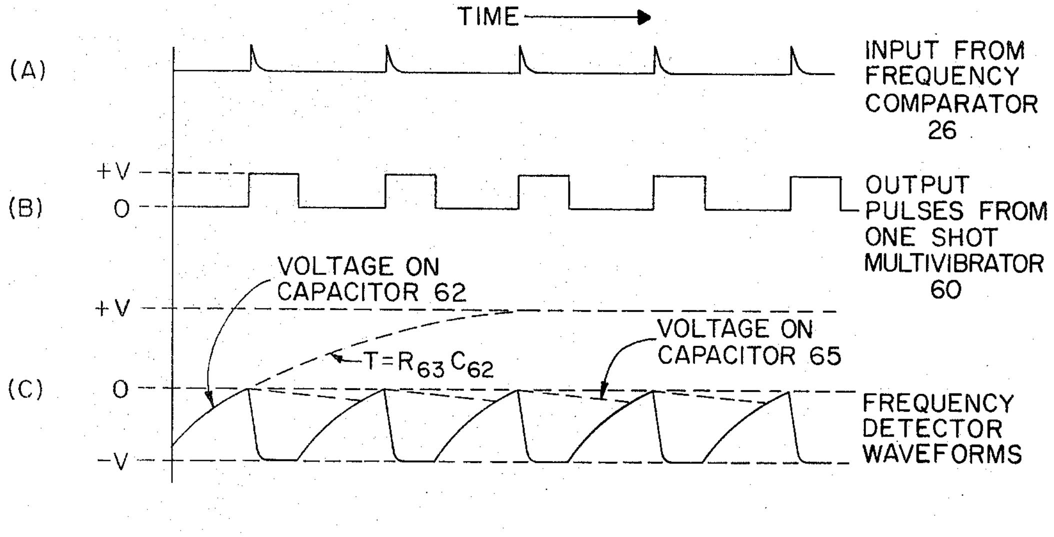

The frequency detector 31, which is employed in the present invention, can be more fully described with reference to FIGURES 6 and 7. The positive spikes 30 from the output of frequency comparator 26, shown in FIGURE 7(A), are fed into the one-shot multivibrator 60, triggering the one-shot multivibrator and generating a positive pulse shown in FIGURE 7(B). Preferably, the one-shot multivibrator 60 is selected so that it will only be triggered by positive spikes 30. Capacitor 68 and clamping diode 69 serve to fix the lower limit of the output of the one-shot multivibrator 60 to —V. The positive pulse emitted from one-shot multivibrator 60 turns on transistor 61, thus dumping the charge on capacitor 62 so that its voltage drops to —V. Resistor 70 limits the current passing to transistor 61. After the positive pulse terminates, capacitor 62 charges through resistor 63 until the one-shot multivibrator 60 is triggered again, as shown in FIGURE 7(C). The peak voltage to which capacitor 62 charges is a function of the pulse repetition rate from one-shot multivibrator 60. Diode 64 and capacitor 65 form a peak detector which reduces the amount of ripple fed to integrating amplifier 32. The variable resistor 63 which charges capacitor 65 is adjusted so that the average voltage appearing across capacitor 65 is zero for a 50 cycle positive pulse train at the input to the one-shot multivibrator 60. The gain of integrating amplifier 32 is very high so that a slight change in the input frequency will change the output voltage V over its maximum range.

The output of frequency detector 31 is a D.C. voltage proportional to the input frequency of the pulse train 30, and is adjusted for producing a nominally zero voltage for a 50 cycles per second input frequency. This D.C. output pulsates at the input frequency of the pulse train 30 which may be momentarily slightly above or below 50 cycles. This output is then amplified and filtered by integrating amplifier 32. A frequency of 50 cycles per second is used for a center frequency since it is relatively easy to filter out its component. In addition, integrating amplifier 32 has a very high gain so that if a small variation above or below 50 cycles per second occurs, the output voltage from integrating amplifier 32 will vary through its maximum dynamic range. As previously stated, if $F_5$ is larger than $F_R$, a negative pulse train 30' is generated by frequency comparator 26. However, there will be no response in this instance by the frequency detector 31 since it is designed to accept only positive pulses.

The output from integrating amplifier 32 is fed back to oscillator 23 and controls its frequency $F_4$. Although oscillator 23 is crystal-controlled, its frequency can be varied slightly to cover a range of frequency variance within tolerance limits expected for $F_3$. The feedback is degenerative so that the beat frequency from frequency comparator 26 is maintained at 50 cycles per second by the output of integrating amplifier 32 which actively controls $F_4$.

As a result, $F_5$ is maintained at 100,000 cycles per second which is 50 cycles per second less than $F_R$. The high gain of integrating amplifier 32 results in a very large loop gain, so that a constant frequency difference within several cycles is maintained between $F_3$ and $F_4$ as $F_3$ varies throughout its expected frequency range. Reference frequency $F_R$ will drift approximately the same percentage of its nominal frequency as $F_4$, both being functions of time and temperature. However, $F_R$ is normally a factor of 100 below that of $F_4$, so that its drift in cycles per second will normally be a factor of 100 less than that of $F_4$. Also, since $F_R$ controls $F_4$, $F_4$ will drift only as much as $F_R$ in cycles per second.

The output from the voltage variable oscillator 23 has a frequency $F_4$ which is always maintained approximately 100,000 cycles per second below $F_3$ by the frequency control voltage from the integrating amplifier 32 and is fed to the mixer 24 and the mixer 33. A third voltage-variable oscillator 34, having a crystal-controlled nominal frequency of 100,000 cycles per second and being voltage-variable over a range of approximately ±50 cycles per second, also feeds into mixer 33. The output of oscillator 34 has a frequency $F_6$ which is mixed with the frequency $F_4$ in mixer 33. The output of mixer 33 is fed to a narrow band-pass filter 35 which selects the wide band $F_4+F_6$. Since $F_4$ is 100,000 cycles per second below $F_3$, and $F_6$ is nominally 100,000 cycles per second, the sum of $F_4+F_6$ is very close to the value of $F_3$. The sum of $F_4+F_6$ shall be referred to as frequency $F_7$. A signal having a frequency $F_7$ passes into output amplifier 36 and is coupled out of the clock synchronizer. A signal having a frequency $F_7$ is also fed into a phase detector 40 along with the input signal having a frequency $F_3$. The phase detector 40 generates a voltage proportional to the phase difference between the signals $F_3$ and $F_7$. The voltage from the phase detector 40 is sent through a low-pass filter 41 which emits a D.C. frequency control voltage which is fed into voltage-variable oscillator 34. Since the feedback is degenerative, $F_3$ and $F_7$ are locked in phase. The resulting loop gain in the circuit is small since the phase lock only has to operate over a range of several cycles per second. Since the loop gain is small, the transient response can be made very small without sacrificing stability.

The above description shows that the method and apparatus of the present invention provides a simple and convenient means for generating a clock signal which is synchronized with an incoming information signal, and maintaining a constant predetermined phase relationship between the two. Furthermore, the invention provides a means to pull a clock signal into phase with and lock it into synchronism with an incoming information signal after the information signal has been interrupted for a period of time and then resumed. Moreover, by the use of the present invention, it can clearly be seen that the above can be achieved without allowing the clock generator to track even the lowest frequency components of jitter in the information signal.

As described above, these objectives are accomplished by the use of two independently acting oscillators each separately controlled by a feedback loop, one feeding back a voltage the amplitude of which depends upon a frequency difference and the other feeding back a voltage the amplitude of which depends upon a phase difference.

From the above description, it will be apparent that various modifications in the method and apparatus described in detail herein may be made. For example, the frequencies of the various oscillators could vary widely depending on the tolerance ranges of the other elements and the incoming signal. Also, it should be clearly understood that the method and apparatus of the present invention could be employed wherever a signal is to be retimed and reshaped, and the portions describing frequency parameters applicable to digital television were given primarily for the purpose of illustration. Therefore, the invention is not intended to be limited to the specific details of the apparatus described herein.

What I claim is:

1. Apparatus for maintaining the phase of a clock signal in a constant phase relationship with an incoming signal over substantial periods of time and during frequency variations of the incoming signal comprising means for generating a first signal, means for maintaining the frequency of said first signal at a fixed differential from the frequency of an incoming signal, means for generating a second signal, means for maintaining the phase of said second signal at a constant phase relationship with the phase of the incoming signal, a mixer for mixing said first and second signals, and circuit means arranged for producing a clock signal having a frequency equal to the sum of the frequencies of said first and second signals.

2. Apparatus for maintaining the phase of a clock signal in a constant phase relationship with an incoming signal over substantial periods of time and during frequency variations of the incoming signal comprising a first voltage-variable oscillator, means for maintaining the frequency of signals from said first voltage-variable oscillator at a fixed differential from the frequency of an incoming signal, a second voltage-variable oscillator, means for maintaining the phase of signals from said second voltage-variable oscillator at a constant phase relationship with the phase of the incoming signal, a mixer for mixing the output signals of said first and second voltage-variable oscillators, and circuit means arranged for producing a clock signal having a frequency equal to the sum of the frequencies of said first and second voltage-variable oscillators.

3. Apparatus for maintaining the phase of a clock signal in a constant phase relationship with an incoming signal over substantial periods of time and during frequency variations of the incoming signal comprising means for generating a first signal, a frequency locking circuit for maintaining the frequency of said first signal a fixed differential from the frequency of an incoming signal, means for generating a second signal, means for maintaining the phase of said second signal at a constant phase relationship with the phase of the incoming signal, a mixer for mixing said first and second signals, and circuit means arranged for producing a clock signal having a frequency equal to the sum of the frequencies of said first and second signals.

4. Apparatus for maintaining the phase of a clock signal in a constant phase relationship with an incoming signal over substantial periods of time and during frequency variations of the incoming signal comprising means for generating a first signal, means for maintaining the frequency of said first signal a fixed differential from the frequency of an incoming signal, means for generating a second signal, a phase locking circuit for maintaining the phase of said second signal at a constant phase relationship with the phase of the incoming signal, a mixer for mixing said first and second signals, and circuit means arranged for producing a clock signal having a frequency equal to the sum of the frequencies of said first and second signals.

5. Apparatus for maintaining the phase of a clock signal in a constant phase relationship with an incoming signal over substantial periods of time and during frequency variations of the incoming signal comprising means for generating a first signal, a frequency locking circuit for maintaining the frequency of said first signal a fixed differential from the frequency of an incoming signal, means for generating a second signal, means for maintaining the phase of said second signal at a constant phase relationship with the phase of the incoming signal, a mixer for mixing said first and second signals, and circuit means arranged for producing a clock signal having a frequency equal to the sum of the frequencies of said first and second signals; wherein said frequency locking circuit includes a mixer for mixing said first signal with the incoming signal and is arranged for generating a signal having a frequency equal to the frequency differential between the two signals, a reference oscillator adapted for emitting a signal having a fixed frequency, frequency comparator means for generating a signal having a frequency equal to the difference between the reference frequency and said frequency differential, a frequency detector for generating a control voltage having an amplitude proportional to the frequency of the signal from said frequency comparator, and means for inserting said control voltage into said first signal generating means for controlling its frequency.

6. Apparatus for maintaining the phase of a clock signal in a constant phase relationship with an incoming signal over substantial periods of time and during frequency variations of the incoming signal comprising means for generating a first signal, means for maintaining the frequency of said first signal a fixed differential from the frequency of an incoming signal, means for generating a second signal, a phase locking circuit for maintaining the phase of said second signal at a constant phase relationship with the phase of the incoming signal, a mixer for mixing said first and second signals, and circuit means arranged for producing a clock signal having a frequency equal to the sum of the frequencies of said first and second signals; wherein said phase locking circuit includes a phase detector for comparing the phase of the incoming signal with the phase of the clock signal and for generating a control voltage proportional to the difference in phase between these two signals, and means for feeding said control voltage to said second signal generating means for controlling its frequency.

7. Apparatus for maintaining the phase of a clock signal in a constant phase relationship with an incoming signal over substantial periods of time and during frequency variations of the incoming signal comprising means for generating a first signal, a frequency locking circuit for maintaining the frequency of said first signal a fixed differential from the frequency of an incoming signal, means for generating a second signal, a phase locking circuit for maintaining the phase of said second signal at a constant phase relationship with the phase of the incoming signal, a mixer for mixing said first and second signals, and circuit means arranged for producing a clock signal having a frequency equal to the sum of the frequencies of said first and second signals; wherein said frequency locking circuit includes a mixer for mixing said first signal with the incoming signal and is arranged for generating a signal having a frequency equal to the frequency differential between the two signals, a reference oscillator adapted for emitting a signal having a fixed frequency, frequency comparator means for generating a signal having a frequency equal to the difference between the reference frequency and said frequency differential, a frequency detector for generating a control voltage having an amplitude proportional to the frequency of the signal from said frequency comparator, and means for inserting said control voltage into said first signal generating means for controlling its frequency; and wherein said phase locking circuit includes a phase detector for comparing the phase of the incoming signal with the phase of the clock signal and for generating a control voltage proportional to the difference in phase between these two signals, and means for feeding said control voltage to said second signal generating means for controlling its frequency.

References Cited by the Examiner

UNITED STATES PATENTS

| | | | |
|---|---|---|---|
| 2,942,203 | 6/1960 | Winkler | 331—2 |
| 3,187,262 | 6/1965 | Crane | 328—133 |
| 3,231,822 | 1/1966 | Tillotson | 325—417 |
| 3,235,800 | 2/1966 | Turrell | 328—134 |

ARTHUR GAUSS, *Primary Examiner.*

R. H. EPSTEIN, *Assistant Examiner.*